United States Patent
Wright et al.

(10) Patent No.: US 7,359,490 B2
(45) Date of Patent: *Apr. 15, 2008

(54) SYSTEMS AND METHODS FOR FACILITATING PLACEMENT OF TELECOMMUNICATIONS TEST CALLS

(75) Inventors: Robert H. Wright, Ramsey, IN (US); Charles E. Raymond, Louisville, KY (US); Gary R. Archibald, Louisville, KY (US); Edward Davis, Nashville, TN (US)

(73) Assignee: AT&T Delaware Intellectual Property, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 11/786,025

(22) Filed: Apr. 10, 2007

(65) Prior Publication Data

US 2007/0189465 A1   Aug. 16, 2007

Related U.S. Application Data

(63) Continuation of application No. 10/377,003, filed on Feb. 28, 2003, now Pat. No. 7,203,284.

(51) Int. Cl.
  *H04M 3/22* (2006.01)
(52) U.S. Cl. .............. 379/15.03; 379/9.01; 379/10.03
(58) Field of Classification Search ............ 379/9.01, 379/10.03, 15.03, 27.02
  See application file for complete search history.

(56) References Cited

U.S. PATENT DOCUMENTS

| | | | |
|---|---|---|---|
| 5,809,108 A | 9/1998 | Thompson et al. | 379/10.02 |
| 6,272,208 B1 | 8/2001 | Kasrai | 379/15.03 |
| 6,405,149 B1 | 6/2002 | Tsai et al. | 702/119 |
| 6,480,469 B1 | 11/2002 | Moore et al. | 370/241 |
| 6,587,543 B1 | 7/2003 | Howard et al. | 379/10.01 |
| 7,203,284 B2 * | 4/2007 | Wright et al. | 379/15.03 |

* cited by examiner

*Primary Examiner*—Barry Taylor
(74) *Attorney, Agent, or Firm*—Merchant & Gould

(57) ABSTRACT

A method for placing a test call in a telecommunications network. The method includes retrieving an indication of a translation change for a telecommunications switch from storage and placing a test call to test whether the translation change was successful.

20 Claims, 2 Drawing Sheets

SYSTEMS AND METHODS FOR FACILITATING PLACEMENT OF TELECOMMUNICATIONS TEST CALLS

RELATED APPLICATIONS

This application is a continuation of U.S. application Ser. No. 10/377,003 entitled "Systems and Methods for Facilitating Placement of Telecommunications Test Calls" filed Feb. 28, 2003 now U.S. Pat. No. 7,203,284, which is incorporated herein by reference.

BACKGROUND

The present invention is directed generally and in various embodiments to systems and methods for facilitating placement of telecommunications test calls.

When telecommunications products or services are added or changed for a customer of a telecommunications service provider, changes must be programmed into the relevant telecommunications switch that serves the customer. Following such programming changes, verification must be made as to whether the change was properly made and whether the change is disruptive to the telecommunications network. Accordingly, extensive mechanized testing is often undertaken in which various test calls are placed to test the change. Because mechanized testing is may be expensive and time-consuming, a technician may place a manual test call prior to the invocation of mechanized testing. If the test call is unsuccessful, the problem may be remedied before mechanized testing is invoked.

SUMMARY

In one embodiment, the present invention is directed to a method for placing a test call in a telecommunications network. The method includes retrieving an indication of a translation change for a telecommunications switch from storage and placing a test call to test whether the translation change was successful.

In one embodiment, the present invention is directed to a system. The system includes a database having stored therein information relating to translation changes in a telecommunications network and a computer in communication with the database and a telecommunications switch located in the telecommunications network, wherein the computer is configured to retrieve an indication of a translation change for the telecommunications switch from the database and to place a test call to test whether the translation change was successful.

In one embodiment, the present invention is directed to a computer readable medium having stored thereon instructions which, when executed by a processor, cause the processor to retrieve an indication of a translation change for a telecommunications switch from storage and place a test call to test whether the translation change was successful.

BRIEF DESCRIPTION OF THE DRAWINGS

Further advantages of the present invention may be better understood by referring to the following description taken in conjunction with the accompanying drawings, in which.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

As used herein, the terms "translations", "translations updates", or "translations changes" means the addition of, for example, a service, feature, or the like to a telecommunications switch by, for example, programming the service, feature, or the like into the switch.

Figure 1:
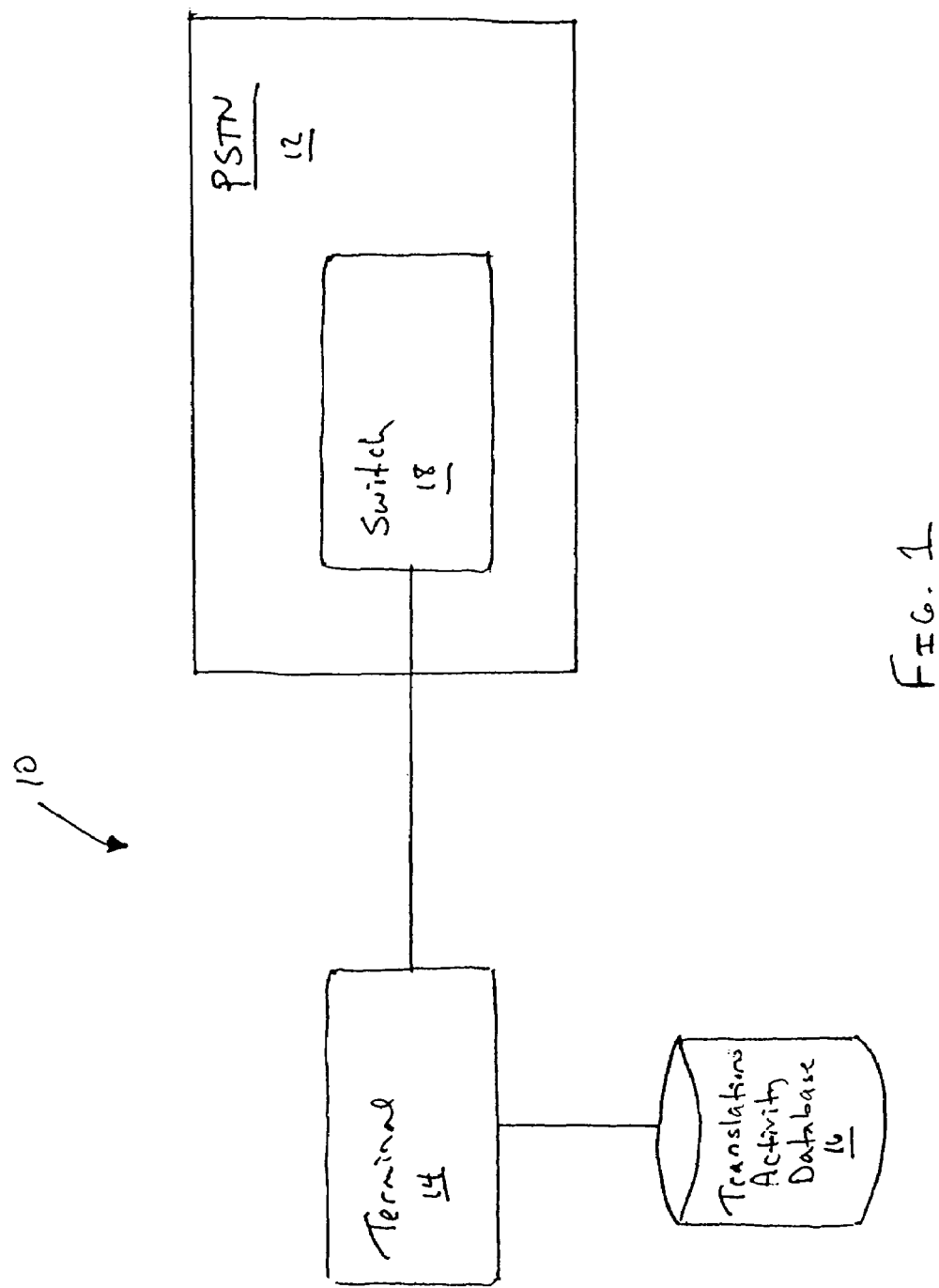
FIG. 1 is a diagram illustrating a test call system according to one embodiment of the present invention.

FIG. 1 is a diagram illustrating a test call system 10 according to one embodiment of the present invention. The system 10 may be used with any telecommunications network, such as the public switched telephone network (PSTN) 12 or an advanced intelligent network (AIN) (not shown), in which translations to telecommunications switches must be changed.

A terminal 14 is in communication with a translations activity database 16. The terminal 14 may be, for example, a personal computer or any other type of computing device that is capable of performing computational and communication activities. The terminal 14 may include, for example, a modem (not shown) that can be used to communicate (i.e. place calls) with a telecommunications switch 18. The translations activity database 16 stores recent switch translations changes or updates relating to the switch 18. The database 16 may be any type of storage that is suitable for storing such data and may be configured as a part of the terminal 14 (e.g. an internal disk drive) or may be located separately from the terminal 14.

In operation and in general terms according to one embodiment of the present invention, the terminal 14 may place a call (e.g. a test call) following a translation change, using, for example, a modem. The translation change may have been made using, for example, the Lucent Mechanized Translations System (MTS). The terminal may log the results of the call so that a user may determine whether the call was successful. Such a procedure may be performed, for example, prior to testing using, for example, a mechanized AMA testing and validation (MATV) service.

Figure 2:
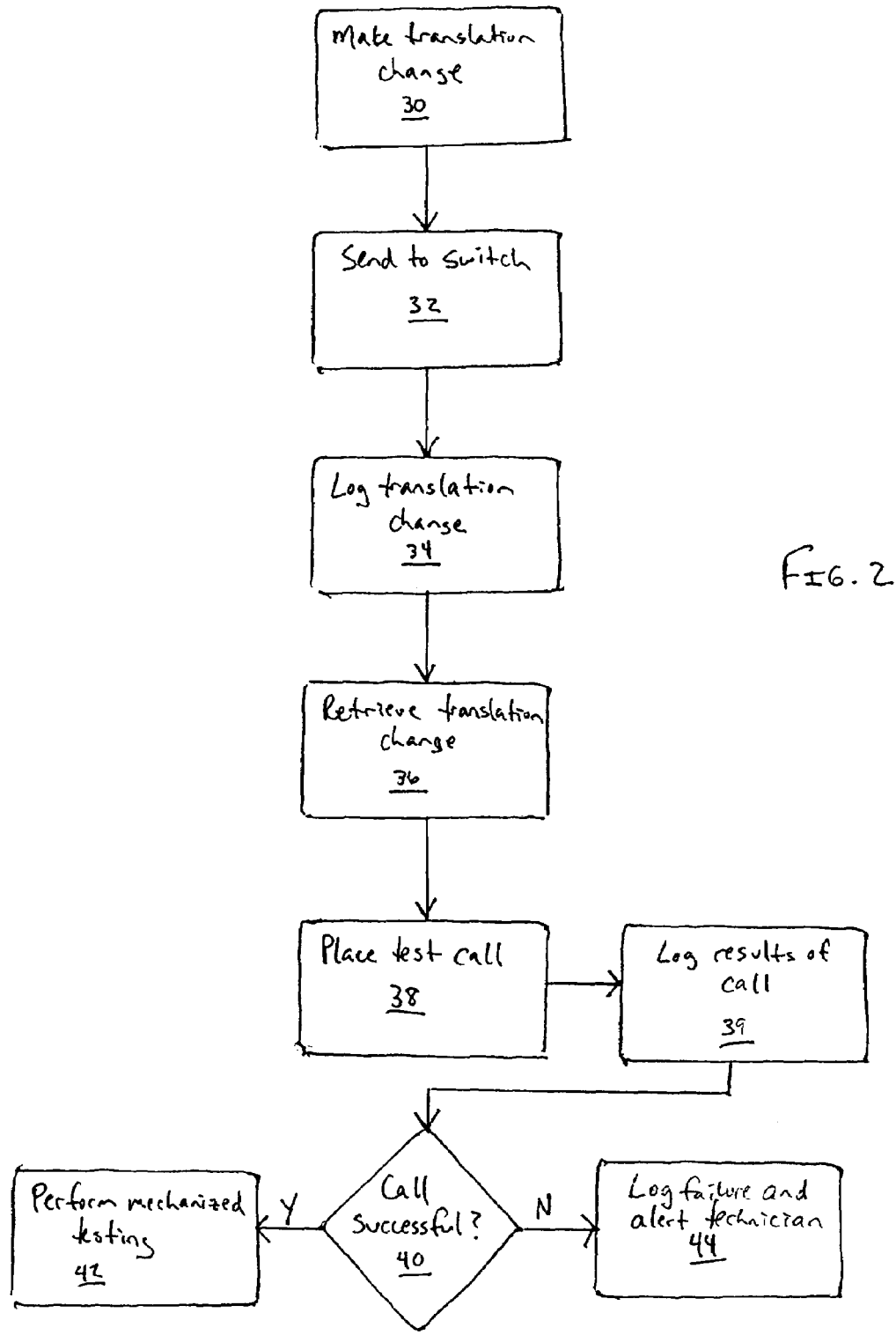
FIG. 2 is a diagram illustrating a process flow through the test call system of FIG. 1 according to one embodiment of the present invention.

FIG. 2 is a diagram illustrating a process flow through the test call system 10 of FIG. 1 according to one embodiment of the present invention. At step 30, a translation change or changes is made using, for example, an MTS system. At step 32, the change or changes is sent to the switch 18. At step 34, the terminal 14 logs the translation change or changes into the database 16. At step 36, the terminal retrieves a translation change from the database 16. The retrieval may be at a periodic time such as, for example, at the beginning or end of a day when all translation changes for a prior period (e.g. the prior day) are retrieved.

At step 38, the terminal 14 places a test call, via the switch 18 by, for example, dialing a telephone number using, for example, a modem in the terminal 14. The test call may be used, for example, to determine if the translation change caused a problem. The test call may also be used prior to testing because mechanized testing, such as MATV testing, may be relatively expensive. At step 39, the results of the test call are logged in, for example, the database 16 or other suitable storage device in communication with or located within the terminal 14.

At step 40, the terminal 14 determines whether the call was successful. The determination at step 40 could be made by, for example, determining whether answer supervision was returned following placement of the call. If the call was successful, at step 42 mechanized testing, such as MATV testing, may be performed. The terminal 14 may create a request for MATV testing and MATV may then make a test call for every class of service in an office to ensure proper billing for the new translation. If the call was unsuccessful, at step 44 the reason for the call being unsuccessful is logged in, for example, the database 16 or other suitable storage device in communication with or located within the terminal 14 and a technician is alerted via, for example, the production of a work order or ticket, an electronic mail message, a wireless paging message, or an automated telephone call. The technician may then remedy the problem by, for example, undoing the translation change.

In one embodiment of the present invention, the methods and modules described herein are embodied in, for example, computer software code that is coded in any suitable programming language such as, for example, visual basic, C, C++, or microcode. Such computer software code may be embodied in a computer readable medium or media such as, for example, a magnetic storage medium such as a floppy disk or an optical storage medium such as a CD-ROM.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. Method for placing a test call in a telecommunications network, the method comprising:
   periodically retrieving translation changes for a previous time period, wherein the translation changes include an indication of a translation change for a telecommunications switch from storage, the indication of the translation change having been stored in the storage after the transition change was made to the telecommunications switch; and
   reporting a reason for an unsuccessful call when a test call is determined to be unsuccessful.

2. The method of claim 1, further comprising logging and indication of the translation change.

3. The method of claim 1, wherein periodically retrieving the indication of translation changes for the telecommunications switch from storage includes retrieving a first indication of a first translation change for the telecommunications switch from a database.

4. The method of claim 1, further comprising:
   placing a test call to test the translation change; and
   logging a result of the test call.

5. The method of claim 4, wherein logging the result of the test call further comprises:
   logging a reason for an unsuccessful test call; and
   remedying the reason for the unsuccessful test call by at least undoing the translation change.

6. The method of claim 4, further comprising determining whether the test call is unsuccessful.

7. The method of claim 6, further comprising alerting a technician when the test call is determined to be unsuccessful.

8. The method of claim 7, wherein alerting a technician includes alerting a technician using at least one of the following: an electronic mail message, a wireless pager message, a telephone call, and a work order.

9. The method of claim 4, wherein placing the test includes placing the test call with a modem that is in communication with the telecommunications switch.

10. The method of claim 1, further comprising performing mechanized testing.

11. A system comprising:
    means for storing information related to translation changes in a telecommunications network;
    means for periodically retrieving all translation changes from a prior time period, wherein the translation changes include an indication of a translation change for a telecommunications switch from storage, the indication of the translation change having been stored after the transition change was made to the telecommunications switch;
    means for reporting a reason a test call is unsuccessful; and
    means for testing and validating a successful test call.

12. The system of claim 11, wherein the means for storing information related to translation changes in the telecommunications network comprises a database.

13. The system of claim 11, wherein the telecommunications network is one of an advanced intelligent network and a public switched telephone network.

14. The system of claim 11, further comprising means for logging a result of the test call.

15. The system of claim 11, means for alterting a technician when the test call is determined to be unsuccessful.

16. A computer-readable medium that stores a set of instructions which when executed by a processor performs a method for placing a test call in a telecommunications network, the method executed by the set of instructions comprising:
    periodically retrieving translation changes for a previous time period, wherein the translation changes include an indication of a translation change for a telecommunications switch from storage, the indication of the translation change having been stored in the storage after the transition change was made to the telecommunications switch; and
    logging a result of a test call;
    logging a reason why the test call is unsuccessful;
    alerting a technician of the logged reason the test call is unsuccessful; and
    reporting the reason for the unsuccessful.

17. The computer readable medium of claim 16 having further instructions which, when executed by the processor, cause the processor to log the indication of the translation change.

18. The computer readable medium of claim 16 having further instructions which, when executed by the processor, cause the processor to invoke a testing process.

19. The computer readable medium of claim 16 having further instructions which, when executed by the processor, cause the processor to transmit an alert to a technician using at least one of the following: an electronic mail message, a wireless pager message, a telephone call, and a work order.

20. The computer readable medium of claim 16 having further instructions which, when executed by the processor, cause the processor to initiate validation process.

\* \* \* \* \*